United States Patent

Dix

[15] 3,663,887

[45] May 16, 1972

[54] MEMORY SENSE AMPLIFIER INHERENTLY TOLERANT OF LARGE INPUT DISTURBANCES

[72] Inventor: Westley Vayne Dix, Wellesley Hills, Mass.

[73] Assignee: RCA Corporation

[22] Filed: Aug. 14, 1970

[21] Appl. No.: 63,757

[52] U.S. Cl. ..................................330/13, 307/237, 330/17, 330/30 R

[51] Int. Cl. ..................................................... H03f 3/18

[58] Field of Search .............307/235, 237; 330/13, 17, 30 R

[56] References Cited

UNITED STATES PATENTS 3,064,141 11/1962 Chou ....................................307/237

*Primary Examiner*—Roy Lake
*Assistant Examiner*—James B. Mullins
*Attorney*—H Christoffersen

[57] ABSTRACT

A memory sense amplifier is disclosed which is particularly useful for detecting small sense signals which appear on a memory selection drive pulse pedestal. A first transistor, a balanced output circuit and a second transistor of opposite conductivity type are connected in series between plus and minus power supply terminals. The base electrodes of the transistors are coupled to respective opposite ends of the memory line, which are normally at plus and minus power supply voltages. The balanced output terminals are normally at ground potential. A memory drive pulse which causes the transistor base voltages to go toward ground results in a surge of current from a capacitor connected between the transistor emitters. The output circuit includes a diode poled to conduct the current surge and limit the output voltage. Thereafter, the conduction returns to the normal value, the output voltage level returns to zero and the amplifier is ready to fully amplify a small information signal from the memory.

3 Claims, 4 Drawing Figures

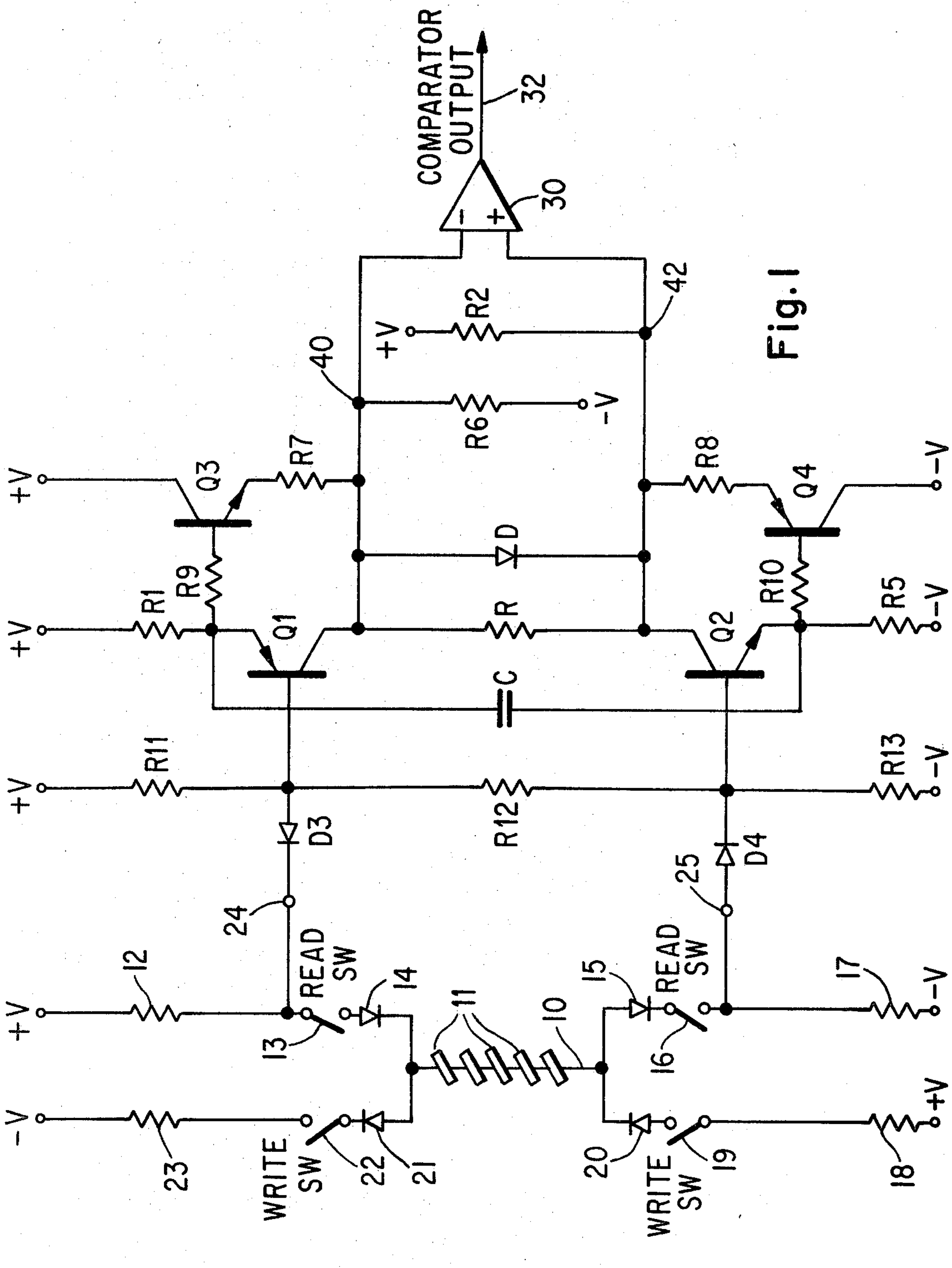
Fig. I
INVENTOR.
Westley V. Dix
BY
Carl V. Olson
ATTORNEY

INVENTOR.
Westley V. Dix
BY
Carl V. Olson
ATTORNEY

INVENTOR.
Westley V. Dix
BY Carl V. Olson
ATTORNEY

MEMORY SENSE AMPLIFIER INHERENTLY TOLERANT OF LARGE INPUT DISTURBANCES

BACKGROUND OF THE INVENTION

The two-wire 2-½ D type of magnetic core memory used in computers includes two sets of orthogonal conductors with magnetic cores at the crossovers of the conductors. Writing information into a core is accomplished by applying current pulses to both of the conductors linking the core. The reading out of the information stored in a core is accomplished by applying a relatively long current pulse through one of the wires linking the core, waiting for the disturbance caused by the leading edge of the pulse to die down, applying a current pulse to the other orthogonal wire linking the core, and then sensing the voltage on the first wire to determine whether the core was switched as a result of containing a "1," or was not switched as a result of containing a "0."

A sense amplifier used with such a memory has its input coupled to the memory line to which a selection drive pulse is applied. The amplifier is thus subjected to a very large input disturbance from which the amplifier must recover before it can detect the following very small sense signals. The amplifier must detect a very small sense signal superimposed on a large voltage pedestal produced by the selection drive pulse.

Previously known sense amplifiers for use with memories of this type have employed various balancing and gating or clamping means to facilitate a recovery of the amplifier from the effects of the selection drives. A popular technique has been to drive two identical paths in the memory including the one desired path, and to sense differentially from the two drive paths in a manner to substantially cancel the drive disturbance. This solution is wasteful of drive power, and requires very careful balancing of circuit components in the two paths to achieve the desired cancellation.

SUMMARY OF THE INVENTION

A sense amplifier constructed according to the teachings of this invention does not depend on the use of balanced or matched components, it does waste power in a dummy or balancing line, and it does not require gating or clamping pulses for recovery or direct-current restoration. The sense amplifier rapidly adjusts to a large differential direct-current voltage at its input without saturation recovery problems, and accepts for differential amplification the small readout signal from a magnetic memory. The resulting output is an amplified readout signal riding on a low direct-current voltage level, such as zero volts, which is independent of the direct-current input level or power supply variations. The amplifier includes at least one base input transistor having a constant current source, and an output circuit biased to normally provide a substantially zero voltage output. When the memory is driven, the amplifier input voltage changes from approximately a power supply voltage to a low voltage near ground. This causes a surge of current from a capacitor through the emitter-collector path of the transistor to the output circuit. The output circuit includes a diode poled to clamp the output surge voltage to a low value near ground potential. After the capacitor is discharged, the conduction in the transistor returns to its normal value and the amplifier is in condition to fully amplify a sense signal from the memory. A preferred form of the amplifier includes two transistors of opposite conductivity types in a balanced circuit arrangement.

BRIEF DESCRIPTION OF THE DRAWING

FIG. 1 is a circuit diagram of a sense amplifier constructed according to the teachings of the invention, together with a portion of a magnetic memory to which the input of the amplifier is connected;

DESCRIPTION OF THE PREFERRED EMBODIMENT

Figures 2, 3:
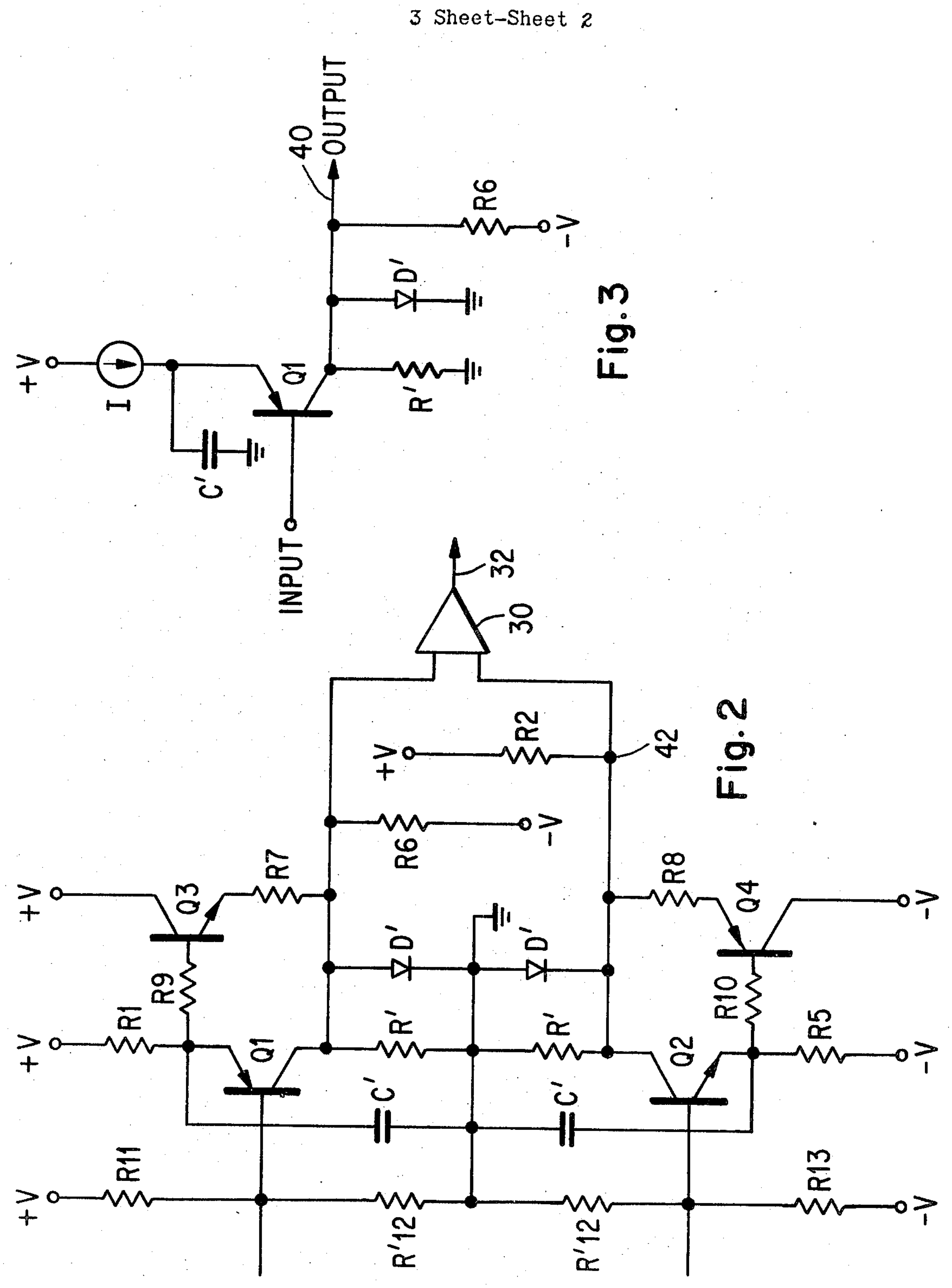
FIG. 2 illustrates an alternative form of a portion of the circuit of FIG. 1.
FIG. 3 is a simplified circuit diagram showing basic elements of the sense amplifier.

Reference is now made to FIG. 1 for a more detailed description of the invention. The line 10 represents a conductor in a magnetic core memory which links a plurality of magnetic cores 11. Orthogonal conductors also linking cores 11 are omitted from the drawing. During the read portion of the memory cycle, a current is driven through memory line 10 through a path from the +V terminal through resistor 12, read switch 13, diode 14, memory line 10, diode 15, read switch 16 and resistor 17 to a −V terminal. During the write portion of the memory cycle, a current in the opposite direction is driven from a +V terminal through resistor 18, write switch 19, diode 20, memory line 10, diode 21, write switch 22 and resistor 23 to a −V terminal. All of the switches shown symbolically are implemented in the form of transistor circuit switches forming part of a memory line selection system. Input terminals 24 and 25 of a sense amplifier are connected to opposite ends of the memory line 10 through read switches 13 and 16, respectively. Since the read switches 13 and 16 are normally open, the voltages normally applied to the amplifier input terminals 24 and 25 are approximately equal to +V and −V power supply voltages, respectively.

The sense amplifier includes a first PNP transistor Q1 and a second transistor Q2 of the opposite conductivity NPN type. A series current path through the transistors is provided from a +V terminal through resistor R1, the emitter-collector path of transistor Q1, an output circuit including resistor R and diode D, the collector-emitter path of transistor Q2 and resistor R5 to a −V power supply terminal. The output circuit also includes a resistor R6 connected from the collector of transistor Q1 to a −V terminal, and a resistor R2 connected from the collector of transistor Q2 to a +V terminal. The collectors of transistors Q1 and Q2 are connected to respective inputs of a comparator 30 having a single output terminal 32.

A transistor Q3 is connected in circuit with the transistor Q1 through resistors R7 and R9 for the purpose of making resistor R1 look like a constant current source for transistor Q1. Stated another way, the transistors Q1 and Q3 are connected in circuit with each other in a conventional manner to deliver a substantially constant current to the upper side or output terminal 40 of the output circuit. Similarly, a constant current transistor Q4 is connected through resistors R8 and R10 in circuit with transistor Q2 to supply a substantially constant current to the lower side or output terminal 42 of the output circuit.

A capacitor C is connected from the emitter of transistor Q1 to the emitter of transistor Q2. The base of transistor Q1 is connected through a diode D3 to the amplifier input terminal 24, and the base of transistor Q2 is connected through a diode D4 to the input terminal 25. The base electrodes of transistors Q1 and Q2 are normally biased at nearly the +V and −V power supply voltages by means of a bias network including resistors R11, R12 and R13. The diodes D3 and D4 are included to disconnect the transistors from the input terminals during a stage in the cycle of operation which might otherwise cause an emitter-base breakdown in transistors Q1 and Q2. This stage of the memory cycle occurs between the read and write portions of the cycle.

The circuit of FIG. 1 is seen to be a balanced circuit with the +V bias terminal at the top connected through the PNP transistor Q1, through a balanced output circuit, and through the NPN transistor Q2 to the −V power supply terminals. A zero voltage or ground potential exists at the points in the middle of the circuit between the +V and −V terminals. Although the circuit shown in FIG. 1 is the preferred embodiment, the circuit can be constructed as shown in FIG. 2, wherein a central ground connection is provided. The elements R12, C, R and D in FIG. 1 are replaced in FIG. 2 by divided resistors R'12, divided capacitors C', divided resistors R', and divided diodes D', all with a common intermediate connection to ground.

The circuit of FIG. 1 is preferred because it provides additional cancellation of common-mode input disturbances beyond that provided when an intermediate ground connection is employed as shown in FIG. 2. However, the operation of the circuit of FIG. 2 is somewhat easier to explain, since the upper and lower halves of the circuit are clearly equivalent, and operative in the same way, but with opposite polarity changes. The top half of the circuit of FIG. 2 is redrawn in simplified form in FIG. 3 for the purpose of most clearly describing the operation of the circuits of FIG. 1 and FIG. 2.

Figure 4:
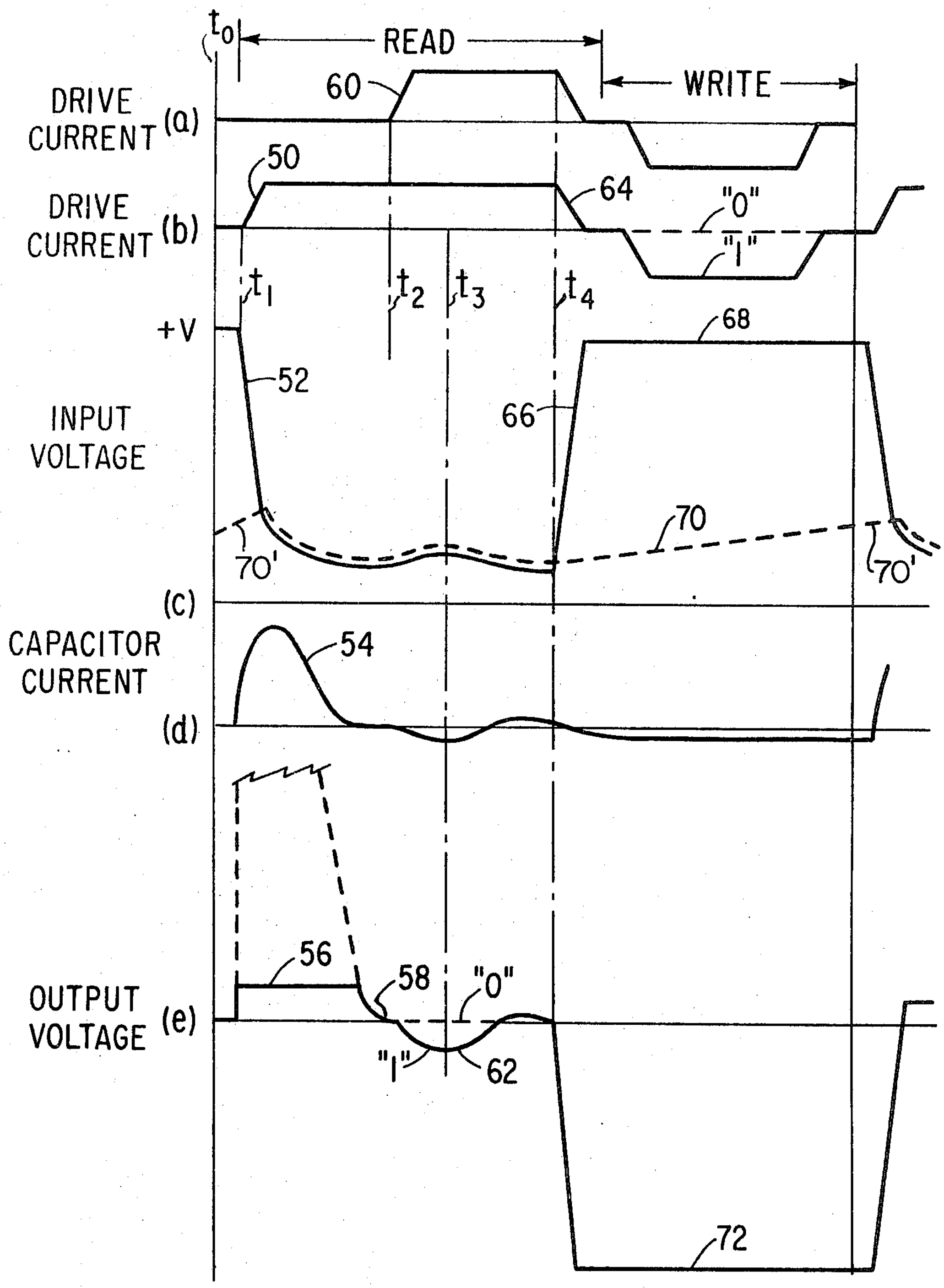
FIG. 4 is a set of voltage and current waveforms that will be referred to in explaining the operation of the invention.

The operation of the invention will now be described with references to the circuits of FIGS. 1 and 3 and the waveforms of FIG. 4. FIG. 4*a* shows a current waveform applied to an orthogonal memory line (not shown in FIG. 1) during the read portion and the write portion of a complete memory cycle. FIG 4*b* shows the current waveform applied through the memory line 10 in FIG. 1. FIG. 4*c* shows the voltage at the base input terminal of transistor Q1 of FIG. 3 during the read and write portions of a memory cycle.

It is seen from FIG. 4*c* that the base input voltage to transistor Q1 is normally and initially at time $t_0$ at approximately the +V power supply voltage. The transistor Q1 is normally or nominally conductive with a current of 2 or 3 milliamperes determined mainly by the current source I. The current is a small value because the emitter and base of transistor Q1 are at nearly the same voltage. The capacitor C′ is charged to a voltage above ground about equal to the power supply voltage. The constant current from the transistor Q1 in FIG. 3 flows into the output circuit which includes the resistor R6 connected to the −V voltage terminal. The resistor R6 is proportioned to act as a current sink or source which draws the same amount of current as is supplied from the current source I. The resistors R6 and R′ are proportioned so that the direct-current voltage at the output terminal 40 is substantially at ground potential. To summarize, at the initial time $t_0$, the base input of transistor Q1 is at approximately +V volts, and the output terminal 40 is at substantially zero volts.

At time $t_1$, the leading edge 50 of the selection current drive pulse of waveform 4*b* is applied to the memory line 10. This causes a very sharp drop in the voltage applied from the memory line to the base input of transistor Q1, as shown at 52 in waveform 4*c*. The voltage at the emitter of transistor Q1 follows the voltage drop at the base of the transistor. This causes a surge of current from the charged capacitor C′ through the transistor to the output circuit. This surge of current from the capacitor, shown at 54 in waveform 4*d*, causes the voltage across resistor R′ to exceed the conduction threshold of diode D′, so that most of the current surge passes through the diode D′ to ground. The voltage at output terminal 40 thus is clamped by the diode D′ to the value shown at 56 in FIG. 4*e*. The described current surge may involve a maximum current through the transistor of about from 50 to 100 milliamperes.

After the surge of current from the capacitor C′ is conducted through transistor Q1 and diode D′ to ground, the current through the transistor Q1 returns to its nominal constant-current value of about 2 or 3 milliamperes. The voltage at output terminal 40 then returns at 58 to its normal value near ground potential. The actual normal direct-current value of potential at output terminal 40 is determined primarily by the values of resistors R′ and R6.

At time $t_2$, the leading edge of the drive current pulse applied to the orthogonal memory conductor occurs, as shown at 60 in FIG. 4*a*. The effect of the drive current of FIG. 4*a* is then added to the effect of the drive current of FIG. 4*b* in the magnetic core linked by both conductors to cause a switching of the core if it was in a condition storing a "1." The switching of the core induces a sense signal in the memory line 10 which is propagated to the base input terminal of transistor Q1. The sense signal applied to the base of transistor Q1 has a polarity tending to reduce the conduction through transistor Q1 and produce a negative-going signal at the output terminal 40 as shown at 62 in FIG. 4*e*. The amplified readout signal at output terminal 40 is a signal relative to ground potential despite the fact that the input voltage at the base of transistor Q1 is now changed from the initial +V voltage to a relatively low potential above ground. The sense signal at output terminal 40 is gated at time $t_3$ to a flip-flop (not shown) which retains the information bit read out from the memory.

At time $t_4$, the selection current supplied to memory line 10 is terminated at 64 in FIG. 4*a*, with the result that the input voltage at the base of transistor Q1 rises rapidly at 66 in FIG. 4*c* toward the +V value. The input voltage then remains for the duration of the write portion of the memory cycle at the +V value shown at 68 in FIG. 4*c*. However, the voltage on the capacitor C′ increases at a slow rate as current flows into the capacitor from the current source I. The gradually increasing potential on the capacitor C′ is shown by the dashed line 70 in FIG. 4*c*. The capacitor C′ keeps the emitter voltage lower than the input base voltage, so that the transistor Q1 is cut off and maintained in a non-conducting condition throughout the write portion of the memory cycle.

During the write portion of the memory cycle, when the transistor Q1 is cut off, the voltage at the output terminal 40 drops to a low value 72 below ground determined by the voltage dividing effect of resistors R′ and R6 connected between ground and the −V terminal. The amplifier is then in a condition, at the end of the write portion of the memory cycle, for the initiation of the read portion of the next following memory cycle. The actual voltages at various points in the circuit at the end of memory cycle depend on the previous history of memory accesses. For example, the level to which the capacitor is charged at the end of a memory cycle depends on the value of current from source I in FIG. 3, the value of capacitor C, the input voltage at time $t_4$ in FIG. 4, and the time duration of the write portion of the memory cycle. The capacitor potential, represented by dashed line 70, has a substantially constant low value, as shown, during cyclical operation of the amplifier. Although the potential on the capacitor is about +V volts, at time $t_0$ during the very first cycle of operation, the potential is low, as shown at 70′, during corresponding times of all following cycles of operation.

The foregoing description of the operation of the simplified circuit of FIG. 3 applies also to the operation of the top halves of the circuits in FIGS. 1 and 2. In the balanced circuits of FIGS. 1 and 2, the bases of the transistors Q1 and Q2 are connected to opposite ends of the memory line 10. The switching of a core storing a "1" induces a sense signal in the memory line 10 which is propagated in opposite directions with opposite polarities to the base input terminals of transistor Q1 and transistor Q2. The opposite-polarity sense signals applied to the bases of transistors Q1 and Q2 have tendencies to reduce the conductions through each of transistors Q1 and Q2, and produce a negative-going signal at the output terminal 40, and a positive-going signal at the output terminal 42. The amplified readout signal at output terminal 32 of the comparator has an amplitude which is the difference between the signals produced in the top and bottom halves of the circuit. Each half of the circuit contributes to the output. However, common mode disturbances are effectively cancelled by the balanced differential arrangement.

The comparator 30 in FIG. 1 is a conventional circuit which provides a "1" output when the input from terminal 40 is more negative than the input from terminal 42, and provides a "0" output when terminal 40 is more positive than terminal 42. If the amplifier is perfectly balanced, the voltages at terminals 40 and 42 are both zero when the input to the amplifier is a "0." To provide a threshold which the input sense signal must exceed before the comparator output registers a "1," it is convenient to proportion the resistors R6 and R2 in relation to the current sources so that a small current normally flows through resistor R and produces a voltage drop thereacross so that terminal 40 is normally about 100 to 200 millivolts more positive than terminal 42. This threshold must be overcome before the comparator output will change from a "0" to a "1."

What is claimed is:

1. An amplifier, comprising
input terminals,
a capacitor, a balanced output circuit including difference voltage output terminals, two transistors of opposite conductivity types each having a base connected to a respective input terminal, an emitter connected to a respective terminal of said capacitor, and a collector connected to a respective side of said balanced output circuit, bias and current source means to make said transistors normally conductive, to charge said capacitor, to supply substantially constant currents to said output circuit, and to provide a substantially zero voltage at said difference voltage output terminals, whereby a large disturbing change in input voltage in a direction to cause increased conduction in said transistors causes an additional current surge from said capacitor to said balanced output circuit, and a clamp diode in said output circuit which is poled to conduct said current surge and limit the resulting difference voltage at the output terminals.

2. A sense amplifier useful in a memory in which the application of a selection drive current to a memory line causes large voltage changes from plus and minus power supply voltage levels to low voltage levels, after which there appears a small differential information signal to be sensed, comprising a capacitor, a balanced output circuit including difference voltage output terminals, two transistors of opposite conductivity types each having a base connected to a respective end of said memory line, an emitter connected to respective terminals of said capacitor, and a collector connected to a respective side of said balanced output circuit, bias and current source means to make said transistors normally conductive, to charge said capacitor, to supply substantially constant currents to said output circuit, and to provide a substantially zero voltage at said difference voltage output terminals, whereby the application of a selection drive current to the memory line results in large reductions in base voltages, which causes said transistors to conduct an additional current surge from said capacitor to said balanced output circuit, and a clamp diode in said output circuit which is poled to conduct said current surge and limit the resulting difference voltage at the output terminals, whereafter the capacitor is discharged, the transistor conductions return to normal values, and the output difference voltage returns to near zero, and then the occurrence of an information signal to be sensed at the bases of the transistors results in an amplified information signal at the difference voltage output terminals.

3. An amplifier, comprising differential input terminals receptive to a disturbing high potential followed by a relatively small signal to be amplified, capacitor means, a balanced output circuit, two transistors of opposite conductivity types each having a base connected to a respective input terminal, an emitter connected to said capacitor means, and a collector connected to a respective side of said balanced output circuit, two constant current sources each connected to the parallel combination of said capacitor means and the emitter-collector path of a respective transistor, said capacitor means maintaining relatively stable low potentials on said emitters which cut off the transistors during the presence of the high input potential on the bases, and allow the transistors to be conductive when the high input potential is removed, and clamp diode means in said output circuit which is poled to conduct a current surge passing through said transistors from said capacitor means when said high input potential is removed, so that the transistors are kept out of saturation, and so that the relatively stable potentials provided by the capacitor means to the emitters cause the amplifier to be quickly stabilized to linearly amplify the desired small input signal applied to the bases.

* * * * *